United States Patent [19]
Wu

[11] Patent Number: 6,031,899
[45] Date of Patent: *Feb. 29, 2000

[54] METHOD AND APPARATUS FOR IDENTIFYING TYPE OF CALL

[75] Inventor: Woody Wu, Plano, Tex.

[73] Assignee: Ericsson Inc, Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/740,161

[22] Filed: Oct. 28, 1996

[51] Int. Cl.[7] .......................... H04M 1/64; H04M 15/00; H04M 1/00

[52] U.S. Cl. .................. 379/142; 379/67.1; 379/88.26; 379/133; 379/372

[58] Field of Search .................. 379/67, 88, 89, 379/67.1, 76, 77, 80, 85, 88.26, 372, 373, 374, 375, 88.01, 142, 201, 212, 133, 134

[56] References Cited

U.S. PATENT DOCUMENTS

| | | | |
|---|---|---|---|
| 4,277,649 | 7/1981 | Sheinbein | 379/88 |
| 4,348,550 | 9/1982 | Pirz et al. | 379/88.03 |
| 4,757,525 | 7/1988 | Matthews et al. | 379/89 |
| 4,782,510 | 11/1988 | Szlam | 379/88 |
| 4,969,186 | 11/1990 | Sayre, II | 379/376 |
| 5,062,133 | 10/1991 | Melrose | 379/94 |
| 5,165,095 | 11/1992 | Borcherding | 379/189 |
| 5,200,994 | 4/1993 | Sasano et al. | 379/142 |
| 5,400,393 | 3/1995 | Knuth et al. | 379/88 |
| 5,467,388 | 11/1995 | Redd, Jr. et al. | 379/196 |
| 5,481,594 | 1/1996 | Shen et al. | 379/67 |
| 5,604,791 | 2/1997 | Lee | 379/67 |
| 5,649,007 | 7/1997 | Yamada | 379/373 |
| 5,828,742 | 10/1998 | Khalid et al. | 379/199 |

FOREIGN PATENT DOCUMENTS

| | | |
|---|---|---|
| 726 699 A2 | 1/1996 | European Pat. Off. . |
| 2 240 693 | 1/1991 | United Kingdom . |
| WO 91/07838 | 5/1991 | WIPO . |
| WO 95/12948 | 2/1995 | WIPO . |

*Primary Examiner*—Fan S. Tsang
*Assistant Examiner*—Allan Hoosain
*Attorney, Agent, or Firm*—Jenkens & Gilchrist

[57] ABSTRACT

A local switch includes circuitry for determining whether a called party is a subscriber of a call type delivery service when a call is being placed to the called party. The local switch also includes circuitry to generate a message to prompt the calling party to identify whether the call is urgent, normal, or telemarketing. If the calling party does not respond in a timely manner the local switch includes circuitry to analyze the response by the calling party and to generate corresponding signals to inform the called party of the unknown call type. More specifically, either a different ring pattern is generated or a specified symbol is displayed on a display or both to inform the called party of the call type. The present invention may be used in conjunction with modern communication networks such as intelligent networks and public land mobile networks.

20 Claims, 10 Drawing Sheets

METHOD AND APPARATUS FOR IDENTIFYING TYPE OF CALL

BACKGROUND OF THE INVENTION

1. Technical Field of the Invention

This invention relates generally to the telecommunications field, and more specifically, to a method and apparatus for identifying a type of phone call.

2. Description of Related Art

Traditionally, the telephone has facilitated communication with friends and family. However, many received calls are from organizations seeking to sell products or to collect donations. As a result, there is a great demand for subscriber features which enable consumers to curtail the ability of outside organizations to invade their privacy at home. Exemplary and commonly known subscriber features of this type include Caller ID, Anonymous Call Rejection, Specified Call Blocking and Do Not Disturb. In general, each of these features either provides information to the called party about an incoming call or operates to reject a call for a specified reason.

A problem with the Caller ID subscriber feature is that a called party must inspect a Caller ID display to determine whether to take the call based upon the information displayed on the screen. Unfortunately, the displayed information is frequently inadequate for determining whether a call should be accepted. As an alternative, a person may choose to block all calls. A problem with blocking all calls by activating the Do Not Disturb feature, however, is that even urgent calls are blocked and are not routed to the called party. What is needed, therefore, is more information so that a called party may determine whether to take a call. Additionally, a system is needed in which an urgent call can be routed to a called party even if a Do Not Disturb feature has been activated for the called party phone. What is also needed is a system and method that enables a person to determine whether to accept an incoming call without having to view a display.

SUMMARY OF THE INVENTION

A method and apparatus are provided for identifying types of incoming calls being made (call type). More specifically, an announcement is made to a calling party that prompts the calling party to specify the call type. The calling party's response is then analyzed to provide an indication of the call type. The categories of call types include urgent, normal, telemarketing, and unknown types of incoming calls. Other call types may be defined according to need.

The call type indication allows the called party to selectively choose which calls to take. For instance, a called party might choose to accept only those calls that are urgent or normal. The indication provided to the called party may be as a display on a Caller ID display device or as a distinctive ring pattern or both. Because the present system can indicate the call type by generating a distinctive ring pattern, a called party can decide whether or not to take a call without having to view a Caller ID display.

The system may also operate to achieve new results when other subscriber features are in use. For example, the system can route an urgent call to a called party's telephone even if the called party has activated a Do Not Disturb feature. Accordingly, other existing subscriber features may be modified to provide enhanced or new features for which there is a demand.

BRIEF DESCRIPTION OF THE DRAWINGS

A better understanding of the method and apparatus of the present invention may be obtained by reference to the following Detailed Description along with the accompanying Drawings wherein.

DETAILED DESCRIPTION OF THE DRAWINGS

Figure 1:
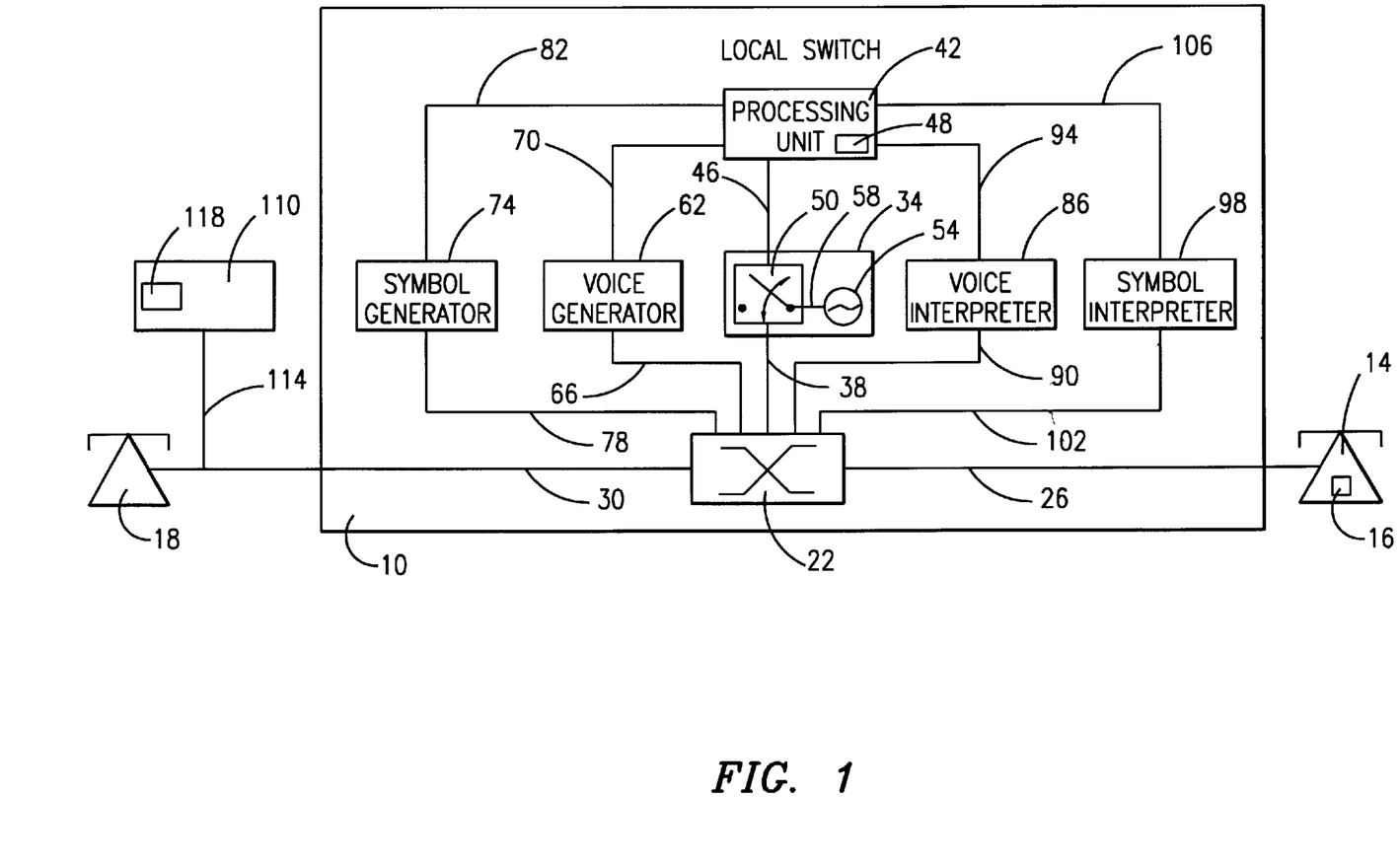
FIG. 1 is a functional block diagram of a local switch which includes one embodiment of the invention.

FIG. 1 is a functional block diagram of a local switch, according to a preferred embodiment of the present invention. Referring now to FIG. 1, a functional block diagram of a local switch 10 for connecting a calling party phone 14 having a keypad 16 to a called party phone 18 is shown. Local switch 10 includes a router 22 which is connected to calling party phone 14 by line 26 and to called party phone 18 by line 30. Generally, router 22 is for connecting one phone line to another and for connecting devices within switch 10 to the phone lines carrying a particular call. Within the system of FIG. 1, router 22 selectively connects lines 26 and 30 to circuitry within local switch 10 which provides or supports specified subscriber features.

Local switch 10 also includes a ring generator 34 for generating ring patterns on the called party phone 18. Ring generator 34 is connected to router 22 by line 38. Ring generator 34 is also connected to a processing unit 42 by line 46. Ring generator 34 includes a switch 50 and a ring signal generator 54, switch 50 being connected to receive a ring signal from a ring signal generator 54 over line 58. Processing unit 42 includes a store 48 for storing a list of subscriber type identification subscriber feature. More specifically, and in the embodiment of FIG. 1, store 48 maintains a subscriber profile for each of the telephone service subscribers served by local switch 10. Within the subscriber profiles of store 48, information is stored which specifies whether the telephone service subscriber is also a subscriber to call type identification subscriber feature. In another embodiment, store 48 merely maintains a list of the telephone service subscribers that are also subscribers to the call type identification subscriber feature.

Local switch 10 also includes a voice generator 62 for generating messages to be played to a calling party. Voice generator 62 is connected to router 22 by line 66 and to processing unit 42 by line 70. Local switch 10 also includes a symbol generator 74 which is connected to router 22 by line 78 and to processing unit 42 by line 82. Symbol generator 74 is for generating signals which cause specified symbols to be displayed on a display device. By way of example, symbol generator 74 can generate signals to cause caller ID display 110, which is connected to line 30 by line 114, to display a specified symbol. Caller ID display 110 receives signals on line 114 to generate a symbol 118, which symbol identifies the call type.

Local switch 10 further includes a voice interpreter 86. Voice interpreter 86 is connected to router 22 by line 90 and to processing unit 42 by line 94. Voice interpreter 86 is for detecting a voice or sound produced at a telephone and for interpreting the voice or sound.

Local switch 10 further includes a symbol interpreter 98. Symbol interpreter 98 is connected to router 22 by line 102 and to processing unit 42 by line 106. Symbol interpreter 98 is for detecting and for interpreting a dual tone multi-frequency (DTMF) signal produced at a phone, which DTMF signal is produced whenever a key on a keypad of the telephone is depressed.

Referring again to FIG. 1, local switch 10 connects calling party phone 14 to called party phone 18 and to caller ID display 110. In FIG. 1, called party phone 18 is connected to calling party phone 14 merely by router 22 within local switch 10. It is understood, however, that one or more tandem switches and local switches (not explicitly shown) may be included for connecting calling party phone 14 to router 22.

In operation, local switch 10 determines whether the called party at called party phone 18 is a subscriber to the call type identification subscriber feature whenever a called party at called party phone 18 receives a call. Local switch 10 determines this by analyzing the content of store 48 to determine if called party 18 is a subscriber to the call type identification subscriber feature.

If a call is being received for a called party whose subscriber profile within store 48 indicates that the party is a subscriber to the call type identification subscriber feature, local switch 10 prompts the calling party at calling party phone 14 to identify the call type. To prompt the calling party, processing unit 42 sends a signal to voice generator 62 over line 70 to cause voice generator 62 to generate an announcement. This announcement is output on line 66 to router 22. The announcement instructs the calling party at calling party phone 14 to identify the call type either by voice or by keypad entry. Router 22 is operable to connect line 66 to line 26 to cause calling party phone 14 to receive the announcement generated by voice generator 62. The call type may be identified either verbally or by depressing a numeric key on keypad 16 of calling party phone 14.

Whether the announcement generated by voice generator 62 instructs the calling party to identify the call type by depressing a key or by responding verbally depends on the type of circuitry found within local switch 10. If local switch 10 includes only a voice interpreter 86, then the announcement generated by voice generator 62 instructs the calling party to identify the call type by verbal response. If local switch 10 includes only a DTMF symbol interpreter 98, then the announcement instructs the calling party to identify the call type by depressing a key on the key pad 16. if local switch 10 includes both a voice interpreter 86 and a symbol interpreter 98, then the announcement gives the calling party the option of responding by depressing a key or by responding verbally.

Voice interpreter 86 and symbol interpreter 98 are both connected to router 22 by lines 90 and 102. Router 22 connects lines 90 and 102 to line 26. Accordingly, voice interpreter 86 and symbol interpreter 98 are connected to receive and interpret the calling party response. Both voice interpreter 86 and symbol interpreter 98 are operable to interpret and determine the call type being placed by the calling party at calling party phone 14. Voice interpreter 86 and symbol interpreter 98 are also connected by lines 94 and 106 to processing unit 42 to produce a signal specifying the call type.

Upon receiving a signal specifying the call type, processing unit 42 transmits a signal on line 82 to symbol generator 74 specifying the type of symbol to be generated. Symbol generator 74 responds by producing signals on line 78. These signals produced by symbol generator 74 cause caller ID display 110 to generate one of a plurality of symbol types. While many different symbol types may be defined, the system of FIG. 1 includes the ability to display four signal types. The four signal types include urgent, normal, telemarketing and unknown. It is understood that other types of symbol types may be defined are within the scope of this invention.

Router 22 connects symbol generator 74 line 78 to called party phone line 30. Accordingly, when router 22 receives a signal from symbol generator 74 on line 78, that signal is transmitted on line 30 to caller ID display 110. Caller ID display 110, which is connected to called party line 30 by line 114, receives the signal generated by symbol generator 74 and produces the corresponding symbol 118 for view by the called party.

Local switch 10 also includes a ring generator 34 which includes a switch 50 and a ring signal generator 54. Processing unit 42 produces a ring signal waveform on line 46. This ring signal waveform causes ring signal generator 54 to be selectively connected and disconnected to line 38 according to a logic state of the ring signal waveform on line 46. In one embodiment, switch 50 connects ring signal generator 54 to line 38 when the voltage level on line 46 is a logic one. When the voltage level on line 46 is characterized by a logic zero, switch 50 opens or disconnects the connection between line 58 and line 38. Accordingly, a string of logic one and logic zero pulses produced by processing unit 42 on line 46 causes a corresponding coupling/decoupling of ring signal generator 54 to line 38. Router 22, in turn, is operable to connect line 38 to called party phone line 18 by line 30 to cause called party phone 18 to ring. Accordingly processing unit 42 may generate normal and different ring patterns by controlling the voltage level on line 46. Generally, in the embodiment shown in FIG. 1, called party phone 18 will ring while a logic one is present on line 46.

Local switch 10 of FIG. 1 instructs a calling party to identify the type of call either by voice or by keypad entry. This is because local switch 10 includes both a voice interpreter 86 and a symbol interpreter 98 to interpret the response by the calling party at calling party phone 14. Local switch 10 also includes a symbol generator 74 and a ring generator 34 for producing specialized symbols and ring patterns to identify the call type. Local switch 10 may be modified to identify the call type by including only one of voice interpreter 86 and symbol interpreter 98 and only one of symbol generator 74 and ring generator 34. Moreover, it is understood that the system of FIG. 1 may be adapted for SS7 networks and for the public land mobile network.

Figure 2:
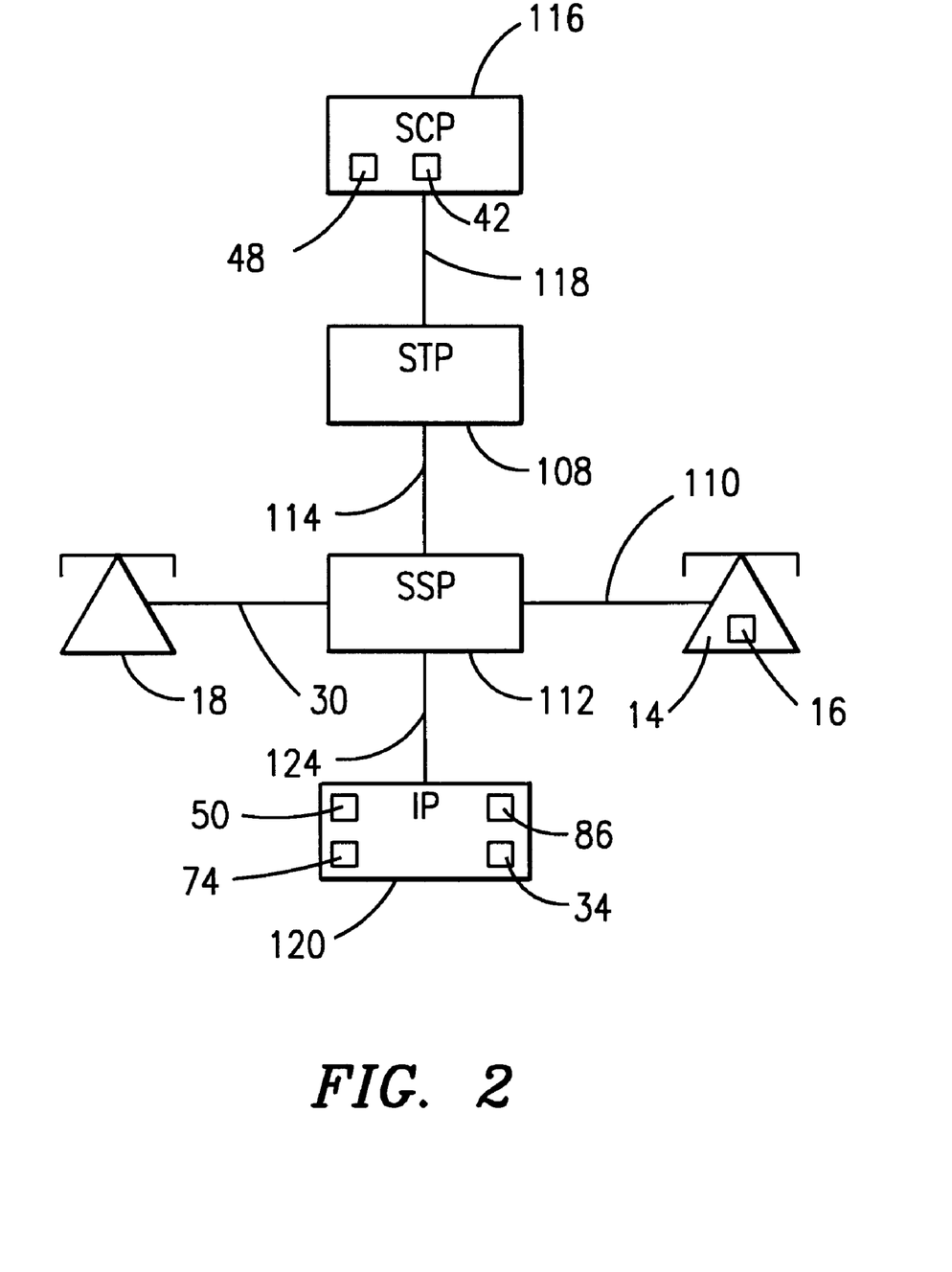
FIG. 2 is a functional block diagram illustrating the invention in an intelligent network.

Referring now to FIG. 2, there is shown a functional block diagram illustrating implementation of the invention in an advanced intelligent network ("AIN") as implemented in North America. The system of FIG. 2, like the system of FIG. 1, includes a ring generator 34, a symbol generator 74, a voice generator 62, a central processing unit 42, a store 48, a voice interpreter 86 and a symbol interpreter 98. The AIN includes a service switching point ("SSP") 120, a signal transfer point ("STP") 122, a service control point ("SCP") 124 and an intelligent peripheral ("IP") 126. Each of the SSP 120, STP 122, SCP 124 and IP 126 is connected in a common AIN configuration as is known to those skilled in the art. The functionality of the commonly numbered elements within FIGS. 1 and 2 is the same for the embodiments of FIGS. 1 and 2. The actual sequence of events for identifying the call, however, is modified as necessary to accommodate AIN network protocols as is known to those skilled in the art. The invention may also be modified to be formed within an intelligent network as implemented within the European telephony networks, or in a public land mobile network, as it was modified to be formed within the system of FIG. 2.

Figure 3:
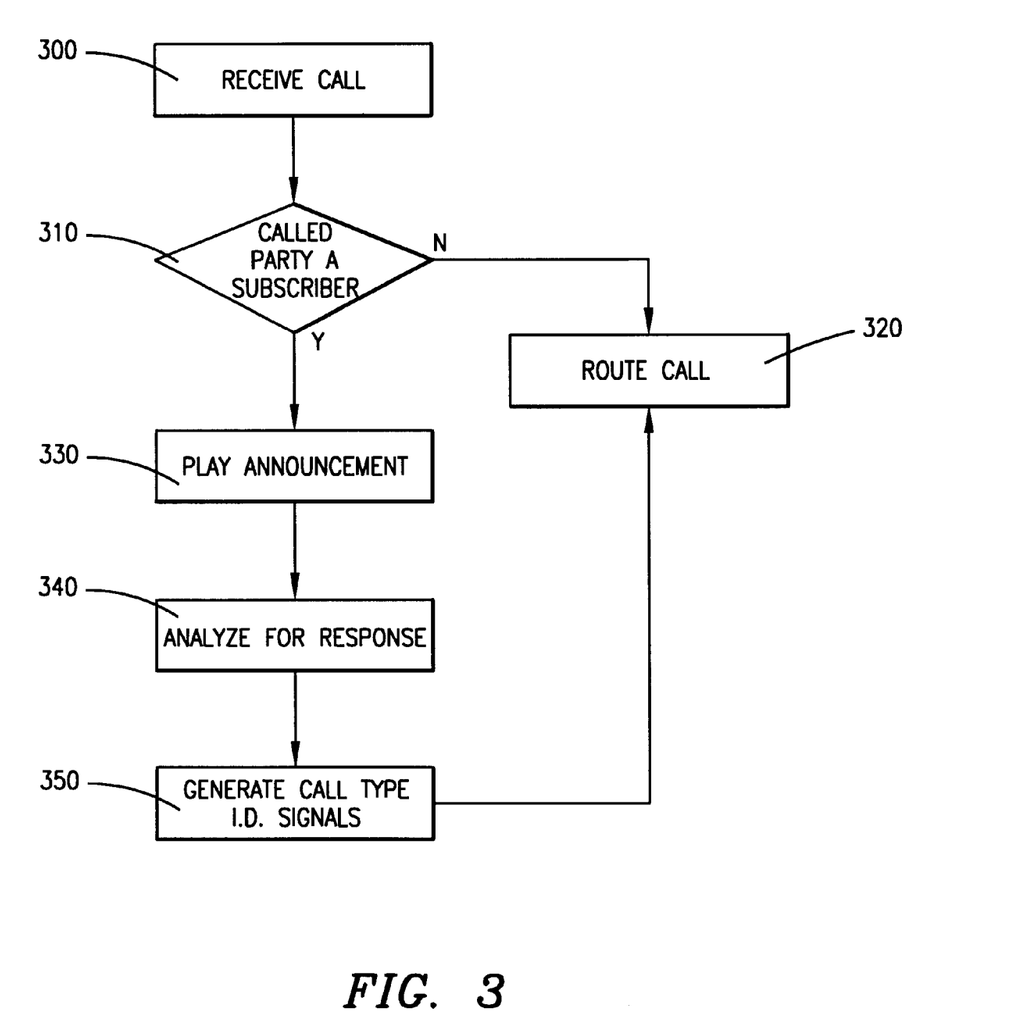
FIG. 3 is a flow chart detailing a method for identifying the call type.

Referring now to FIG. 3, there is shown a flow chart detailing a method for identifying the call type. The method of FIG. 3 includes receiving a call (step 300) and determining if the called party is a subscriber to the called party identification subscriber feature (step 310). If a called party is not a subscriber to the call type identification subscriber feature, then the call is routed (step 320), as customary. If the called party is a subscriber of the call type identification subscriber feature, then an announcement is played to instruct the calling party to identify the call type (step 330). After the announcement has been played, the calling party phone line is monitored and signals thereon are analyzed for response (step 340). Thereafter, at least one call type identification signal is generated (step 350). If no response is received within a specified amount of time, the call type identification signal generated is that of "unknown".

Figure 4:
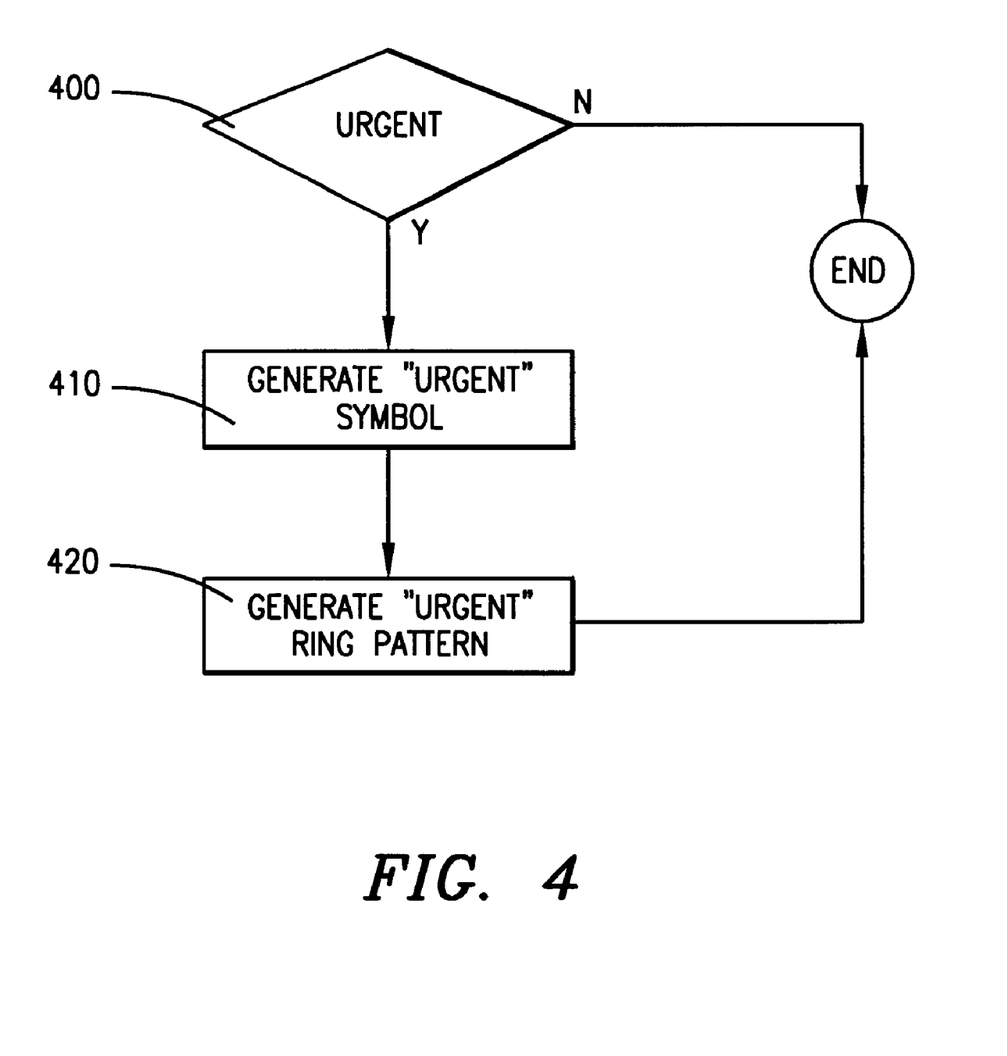
FIG. 4 is a flow chart identifying a method for identifying an urgent call type.

Referring now to FIG. 4, a flow chart identifying a method for identifying an urgent call type is shown. The first step is to determine whether the call is an urgent call type (step 400). If the call type is not urgent, the method identified in FIG. 4 is not practiced. If the call is an urgent call type, an urgent symbol is generated for display (step 410) on caller ID display 110 of FIG. 1. Additionally, a different ring pattern to identify an urgent call type is generated (step 420) by the processing unit 42 and by ring generator 34 of the systems of FIGS. 1 and 2.

Figure 5:
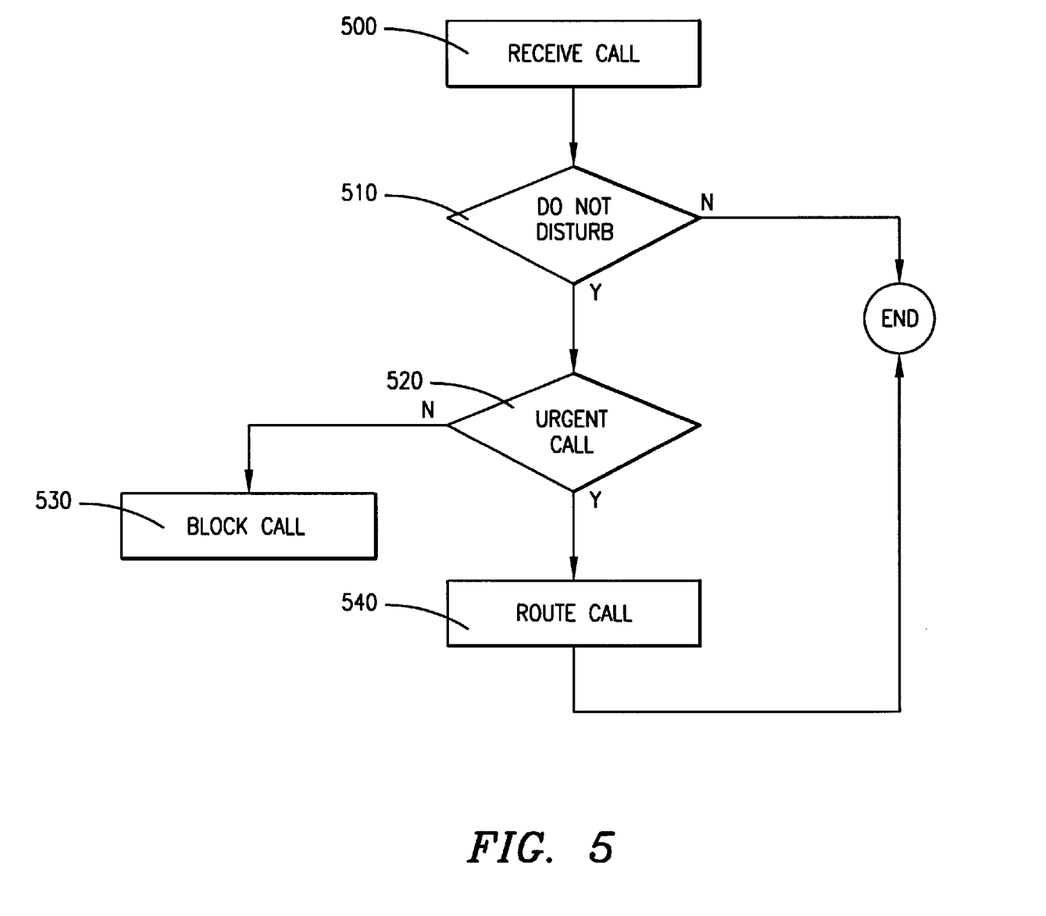
FIG. 5 is a flow chart identifying a method for routing a call when a called party includes subscriber features of do not disturb and call type identification.

Referring now to FIG. 5, a flow chart is shown which includes a method for routing a call when a called party includes subscriber features of "do not disturb" and "call type identification". After receiving a call (step 500), a determination is made whether the called party has activated a "do not disturb" mode of operation (step 510). A standard "do not disturb" mode of operation is one in which all calls, including urgent calls, are blocked. If the "do not disturb" is selected or activated, as determined in step 510, then a determination is made whether the call type is an urgent call (step 520). If the call is not an urgent call, the call is blocked (step 530). Otherwise, the call is routed (step 540) and the call type is identified as described in the method of FIG. 3.

Figure 6:
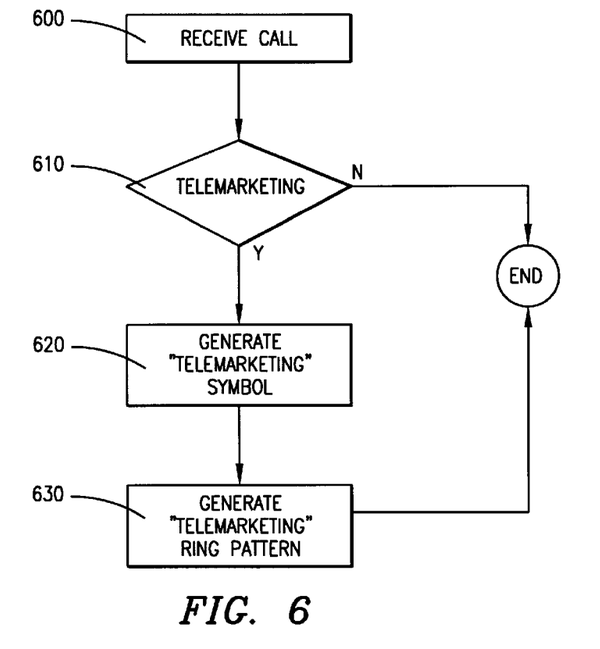
FIG. 6 is a flow chart for identifying a telemarketing call type.

Referring now to FIG. 6, there is shown a method for identifying to the called party that a telemarketing call type is being received. Once a call is received (step 600), a determination is made whether the type call is a telemarketing call (step 610). If the call type is not a telemarketing call type, then the method of FIG. 6 is not practiced. If the call type is a telemarketing call type, then a telemarketing symbol is generated for display on a caller ID display 110 of FIGS. 1 or 2 (step 620). Additionally, a different ring pattern is generated to identify a telemarketing call type (step 630).

Figure 7:
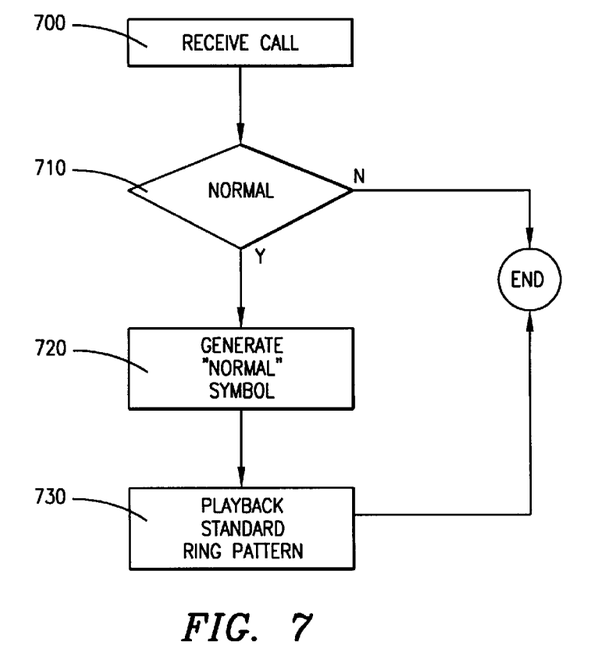
FIG. 7 is a flow chart specifying a method for identifying a normal call type.

Referring now to FIG. 7, there is shown a method for identifying to a called party that a normal call type is being received. Once a call is received (step 700), a determination is made whether the type of call is a normal call type (step 710). If it is not a normal type of call, the method of FIG. 7 is not practiced. If, however, the call type is a normal call type, a "normal" symbol is generated for display on caller ID display 110 of FIG. 1 (step 720). Additionally, a normal ring pattern is generated for the called party phone 18 by ring generator 34 and processing unit 42 (step 730). A normal ring pattern is one whose ring pattern is commonly used by the local switch for the telephones serviced by the local switch.

Figure 8:
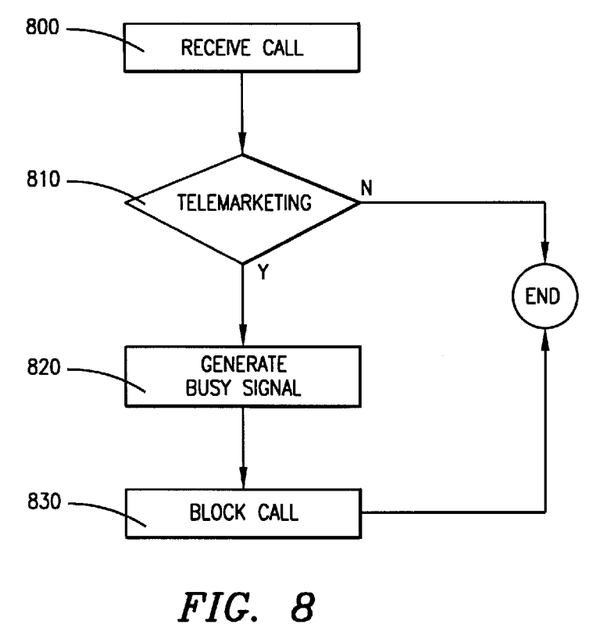
FIG. 8 is a flow chart specifying a first method for responding to a call type identified as a telemarketing call type.

Referring now to FIG. 8, there is shown a method for responding to a call type identified as a telemarketing call type. More specifically, once a call is received (step 800) and it is determined that the type call is a telemarketing call type (step 810), then a busy signal is generated for the calling party at calling party phone 14 of FIG. 1 (step 820). Additionally, the call is blocked (step 830).

Figure 9:
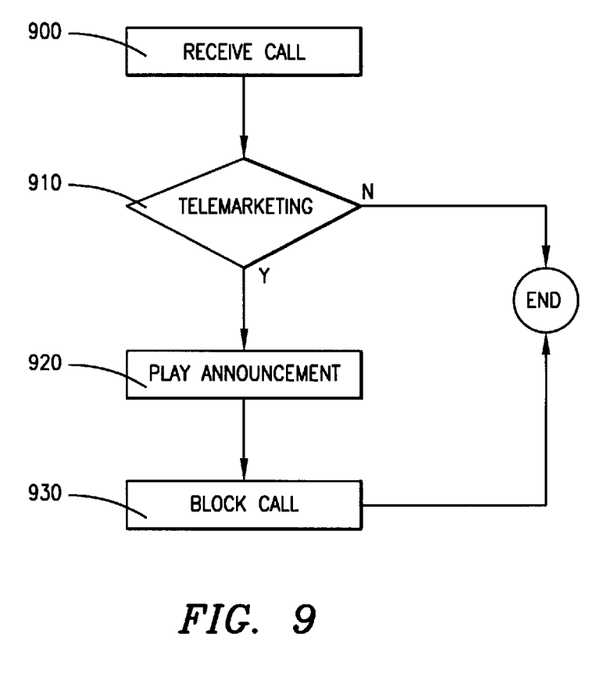
FIG. 9 is a flow chart specifying a second method for responding to a telemarketing call type.

Referring now to FIG. 9, there is shown another method for responding to a call type identified as a telemarketing call type. More specifically, once a call is received (step 900) and it is determined that the call is a telemarketing type call (step 910), an announcement is played (step 920). The played announcement indicates to the calling party that the called party, is not accepting telemarketing type calls. Additionally, the call is blocked (step 930).

Figure 10:
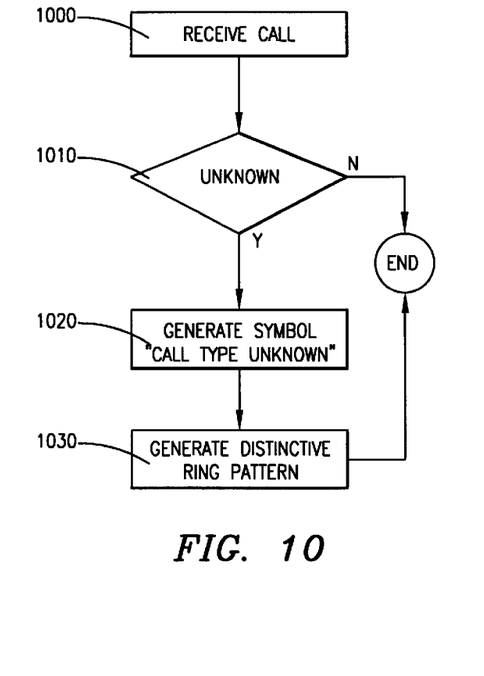
FIG. 10 is a flow chart specifying a first method for identifying an unknown call type.

Referring now to FIG. 10 there is shown a method for responding to a call type identified as an unknown. Once a call is received (step 1000) and it is determined whether the call type is an unknown call type (step 1010). If the call type is not an unknown call type, then the method of FIG. 10 is not practiced. If the call type is an unknown call type, then a symbol is generated specifying call type unknown (step 1020). Additionally, a distinctive ring pattern is generated to identify the unknown call type (step 1030).

Figure 11:
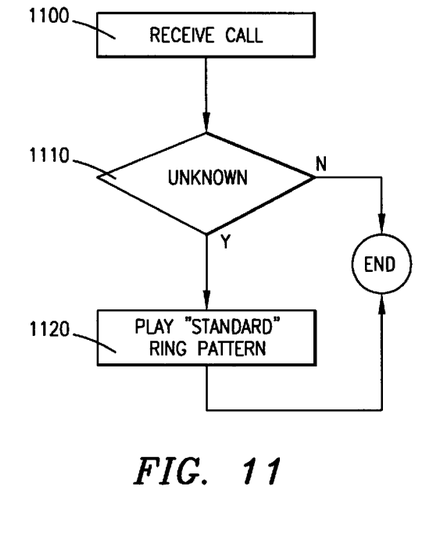
FIG. 11 is a flow chart specifying a second method of responding to an unknown call type.

Referring now to FIG. 11, there is shown an alternate response for an unknown call type. Specifically, a standard ring pattern is generated on called party phone 18 of the systems of FIGS. 1 and 2 (step 1130).

Figure 12:
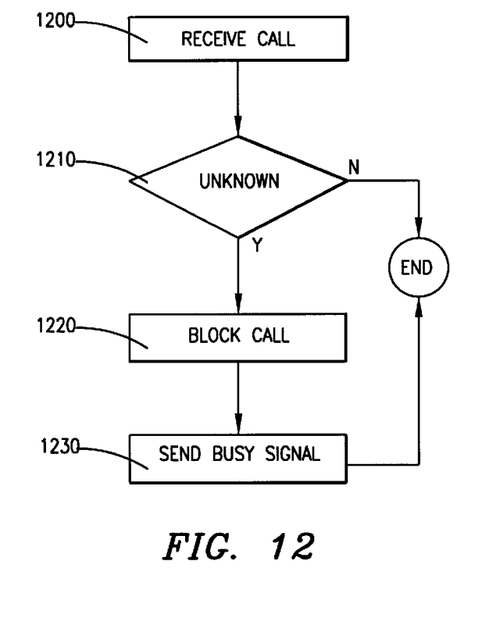
FIG. 12 is a flow chart specifying a third method for responding to an unknown call type.

Referring now to FIG. 12, there is shown another method for responding to a call type identified as an unknown call type. After a call is received (step 1200), it is determined whether the call is an unknown call type (step 1210). If the call type is not an unknown call type, then the method of FIG. 12 is not practiced. If, on the other hand, the call type is an unknown call type, then the method of FIG. 12 includes blocking the call (step 1220) and generating a busy signal to the calling party (step 1230).

Each method described above for identifying a call type includes the generation of a symbol for display and the generation of a different ring pattern. For each of those methods, one may vary the method by only generating a symbol or by only generating a different ring pattern. Thus, either a symbol may be generated to identify the call type or a ring pattern may be generated to identify the call type as the call is being routed. Alternatively, as shown in the methods described above, a symbol and a specified ring pattern may be generated.

Figure 13:
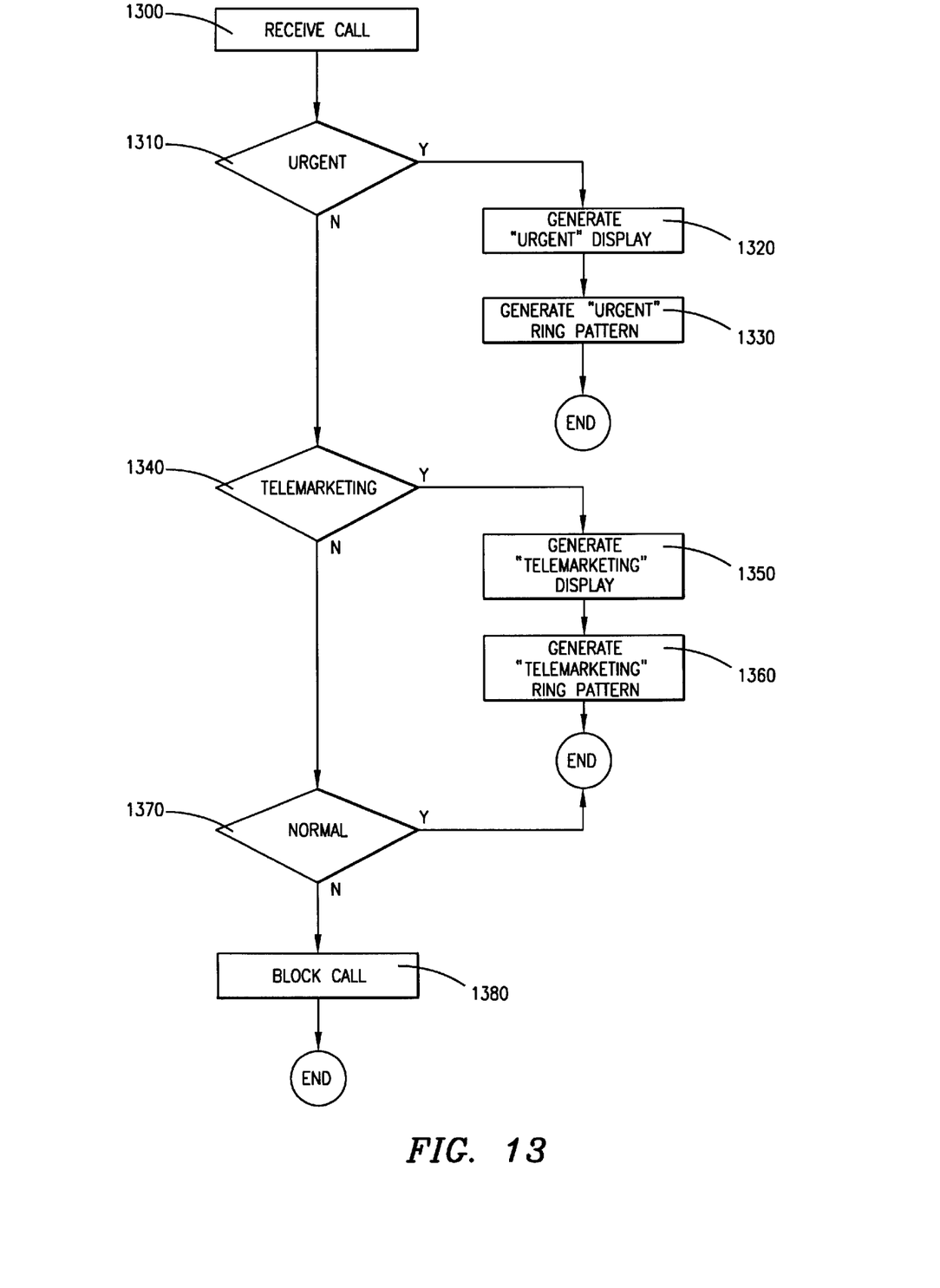
FIG. 13 is a flow chart specifying an overall method of identifying a call type.

As an example, and referring now to the method of FIG. 13, there is shown an overall method of identifying a call type. Once a call is received (step 1300), a determination is made whether the call is urgent (step 1310). If the call is urgent, then a symbol is generated specifying that the call type is urgent (step 1320). Additionally, a ring pattern is generated specifying that the call type is urgent (step 1330). On the other hand, if the call type is not urgent, then it is determined whether the call type is a telemarketing call (step 1340). If the call type is a telemarketing call type then a symbol is generated for display on the caller ID display 110 of FIG. 1 to indicate the same (step 1350). Additionally, a ring pattern to identify that the call type is a telemarketing call is generated (step 1360). Otherwise, if the call type is not determined to be a telemarketing call type (step 1340), then a determination is made whether the call type is a normal call type (step 1370). If the call type is a normal call type, then it is routed as normal and the method of FIG. 13 is no longer practiced. If the call type is not normal, however, then the only call type which remains is unknown. Accordingly, the call is blocked (step 1380).

Figure 14:
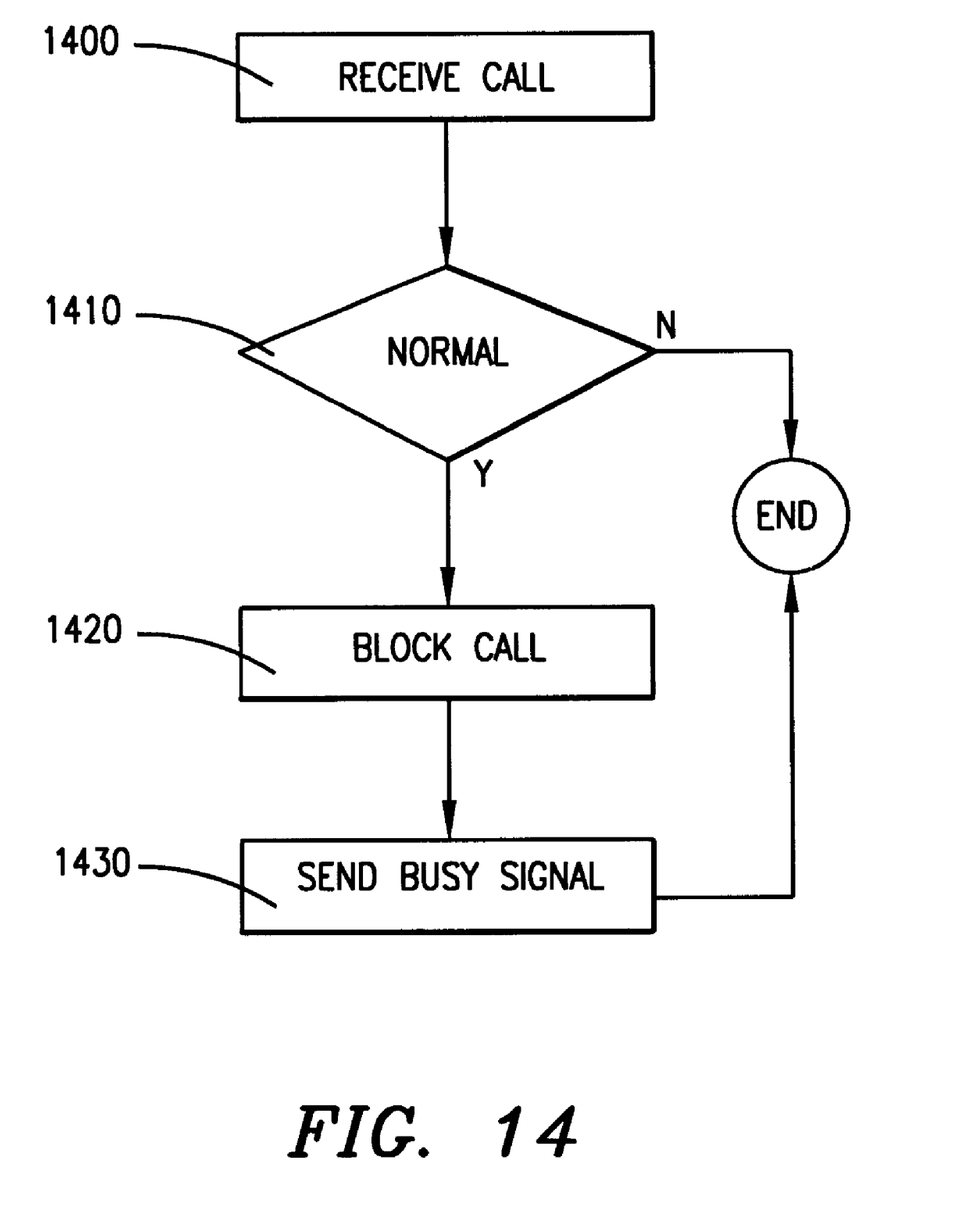
FIG. 14 is a flow chart specifying a method for responding to a normal call type.

Referencing now to FIG. 14, there is shown a method for responding to a normal call type. After a call is received (step 1400), it is determined whether the call is a normal call type (step 1410). If not, the method illustrated in FIG. 14 is not practiced. If the call type is a normal call type, the call is blocked (step 1420) and a busy signal is sent to the calling party (step 1430). In another embodiment, an announcement is generated at step 1430 to inform the calling party the call is being dropped.

Although an embodiment of the method and apparatus of the present invention has been illustrated in the accompanying Drawings and described in the foregoing Detailed Description, it is understood that the invention is not limited to the embodiment disclosed, but can be arranged in numerous ways and that modifications and substitutions may be made without departing from the spirit of the invention as set forth and defined by the following claims. By way of example, other call types may be defined, such as "business". Corresponding methods may also be modified. By way of example, the method of FIG. 5 wherein only "urgent" call types are routed whenever a "do not disturb" feature is activated could be modified to also allow "business" call types to be routed whenever a "do not disturb" feature is activated.

I claim:

1. A local switch for call type identification of a calling party to a called party, prior to a communication therebetween, via a selective distinctive ring pattern signal, from a plurality of distinctive ring pattern signals and in one-to-one correspondence with said call type identification, to said called party, said telecommunications system comprising:

first message generator means for generating, upon receipt of a communication request from said calling party, a prompting message from said local switch to said calling party, said prompting message requesting a response from said calling party for the call type identification of said communication request from said calling party to said called party;

message interpretation means for interpreting, upon receipt of said response, the call type identification entered by said calling party;

second message generator means for generating, upon interpretation of said response, said selective distinctive ring pattern signal to said called party, said selective distinctive ring pattern signal being in one-to-one correspondence to said call type identification; and blocking means, upon interpretation of said response, to selectively block said communication between said calling party and said called party.

2. The system of claim 1, wherein the message interpretation means interprets voice responses.

3. The system of claim 1, wherein the message interpretation means analyzes dual tone multi-frequency (DTMF) tones generated by the calling party.

4. The system of claim 1, wherein the second message generator means generates a specified symbol on a display to identify said call type identification being routed to the called party.

5. The system of claim 1, wherein said communication is blocked when said call type identification is selected from the group consisting of normal, urgent, telemarketing and unknown.

6. The system of claim 1, wherein said message generator means generates a calling party announcement at a calling party telephone, said announcement including a message that said communication is blocked.

7. A method for call type identification of a calling party to a called party, prior to a communication therebetween, via a selective distinctive ring pattern signal, from a plurality of distinctive ring pattern signals and in one-to-one correspondence with said call type identification, to said called party, said method comprising the steps of:

receiving a communication request from said calling party to said called party;

prompting from said local switch said calling party for said call type identification of said communication;

responding, by said calling party, the prompt for said call type identification;

interpreting the call type identification response of said calling party;

selectively generating, upon the interpretation of the call type identification response, said selective distinctive ring pattern signal to said called party, said selective distinctive ring pattern signal being in one-to-one correspondence to said call type identification; and selectively blocking, upon the interpretation of the call type identification responses said calling party from communicating with said called party.

8. The method of claim 7, wherein said call type identification is selected from the group consisting of normal, urgent, telemarketing and unknown.

9. The method of claim 8, wherein said communication is blocked when said call type identification is selected from the group consisting of normal, telemarketing and unknown.

10. The method of claim 9, wherein said step of generating includes the step of generating a calling party announcement at a calling party telephone, said announcement including a message that said communication is blocked.

11. The method of claim 7, wherein the step of generating said selective distinctive ring pattern signal includes the step of generating a called party caller ID display signal to display a selective distinctive symbol thereon, said selective distinctive signal being one of a plurality of distinctive symbols and in one-to-one correspondence with said call type identification, said call type identification being selected from the group consisting of normal, urgent, telemarketing and unknown.

12. The method of claim 11, wherein said communication is blocked when said call type identification is selected from the group consisting of normal, telemarketing and unknown.

13. The method of claim 7, wherein said step of generating includes the step of generating a calling party announcement at a calling party telephone, said announcement including a message that said communication is blocked.

14. The method of claim 7, wherein, when said call type identification is urgent and a do not disturb feature has been activated by said called party, said selective distinctive ring.

15. A local switch for call type identification of a calling party to a called party, prior to a communication therebetween, via a selective distinctive ring pattern signal, from a plurality of distinctive ring pattern signals and in one-to-one correspondence with said call type identification, to said called party, said telecommunications system comprising:

- a first message generator for generating, upon receipt of a communication request from said calling party, a prompting message from said local switch to said calling party, said prompting message requesting a response from said calling party for the call type identification of said communication request from said calling party to said called party;
- a message interpreter for interpreting, upon receipt of said response, the call type identification entered by said calling party;
- a second message generator for selectively generating, upon interpretation of said response, said selective distinctive ring pattern signal to said called party, said selective distinctive ring pattern signal being in one-to-one correspondence to said call type identification; and
- a blocking means for selectively blocking, upon interpretation of said response, said communication between said calling party and said called party.

16. The system of claim 15, wherein the message interpreter interprets voice responses.

17. The system of claim 15, wherein the message interpreter analyzes dual tone multi-frequency (DTMF) tones generated by the calling party.

18. The system of claim 15, wherein the second message generator also generates a specified symbol on a display to identify said call type identification being routed to the called party.

19. The system of claim 15, wherein said communication is blocked when said call type identification is selected from the group consisting of normal, urgent, telemarketing and unknown.

20. The system of claim 15, wherein said message generator means generates a calling party announcement at a calling party telephone, said announcement including a message that said communication is blocked.

\* \* \* \* \*